United States Patent
Wu et al.

(10) Patent No.: US 11,342,606 B2
(45) Date of Patent: May 24, 2022

(54) LITHIUM ION BATTERY WITH AN INTERNAL HEATING DEVICE

(71) Applicant: RISESUN MENGGULI NEW ENERGY SCIENCE & TECHNOLOGY CO., LTD, Beijing (CN)

(72) Inventors: Ningning Wu, Beijing (CN); Yongzhi Mao, Beijing (CN); Hongwei Zhao, Beijing (CN)

(73) Assignee: Risesun Mengguli New Energy Science & Technology Co., Ltd, Beijing (CN)

( * ) Notice: Subject to any disclaimer, the term of this patent is extended or adjusted under 35 U.S.C. 154(b) by 119 days.

(21) Appl. No.: 16/760,099

(22) PCT Filed: Jan. 28, 2019

(86) PCT No.: PCT/CN2019/073341
§ 371 (c)(1),
(2) Date: Apr. 29, 2020

(87) PCT Pub. No.: WO2020/147148
PCT Pub. Date: Jul. 23, 2020

(65) Prior Publication Data
US 2021/0218083 A1   Jul. 15, 2021

(30) Foreign Application Priority Data

Jan. 17, 2019  (CN) .......................... 201910043020.1
Jan. 17, 2019  (CN) .......................... 201920075786.X

(51) Int. Cl.
*H01M 10/615*   (2014.01)
*H01M 10/617*   (2014.01)
(Continued)

(52) U.S. Cl.
CPC ....... *H01M 10/615* (2015.04); *H01M 10/617* (2015.04); *H01M 10/63* (2015.04);
(Continued)

(58) Field of Classification Search
CPC .. H01M 10/60; H01M 10/615; H01M 10/617; H01M 10/63; H01M 10/654; H01M 10/0525
See application file for complete search history.

(56) References Cited

U.S. PATENT DOCUMENTS

2006/0087280 A1*  4/2006  Miyashita ........... H01M 50/572
                                                    320/104
2018/0281618 A1* 10/2018  Ogaki ................ H01M 10/443

FOREIGN PATENT DOCUMENTS

CN      106450582 A   *   2/2017   .......... H01M 10/615

OTHER PUBLICATIONS

CN 106450582 A. Sep. 6, 2016. English machine translation by EPO. (Year: 2016).*

* cited by examiner

*Primary Examiner* — James Lee
(74) *Attorney, Agent, or Firm* — Browdy and Neimark, P.L.L.C.

(57) ABSTRACT

A lithium ion battery with an internal heating device including a cell provided inside the battery, a first cell tab and a second cell tab provided at the upper end of the cell, and the first cell tab and the second cell tab respectively connected to the cell, a heat generating device inside the cell and including a first layer of heating sheet respectively connected to a first tab of the first layer and a second tab of the first layer extending outside of the cell, a control switch composed of a first control switch and a second control switch, wherein an external equipment and the second control switch form a first branch, the first and second cell
(Continued)

tabs and the cell form a second branch, and the first and second tabs, the first layer, and the first control switch form a third branch.

7 Claims, 4 Drawing Sheets

(51) Int. Cl.
  *H01M 10/63*  (2014.01)
  *H01M 10/654*  (2014.01)
  *H01M 10/0525*  (2010.01)

(52) U.S. Cl.
  CPC ...... *H01M 10/654* (2015.04); *H01M 10/0525* (2013.01); *H01M 2200/10* (2013.01)

LITHIUM ION BATTERY WITH AN INTERNAL HEATING DEVICE

TECHNICAL FIELD

The present disclosure relates to the field of heating of lithium ion batteries, and particularly relates to a lithium ion battery with an internal heating device.

BACKGROUND

Lithium ion batteries include liquid-state, semi-solid, or solid-state lithium ion batteries. Most lithium ion batteries have weak charge and discharge capabilities under high current due to the SEI film, the surface charge transfer impedance, and poor diffusion of lithium ions in the electrode at low temperatures, which limits the rate and power performance of the lithium ions.

Therefore, it has become an important research direction to improve the performance of batteries at low temperatures by auxiliary means, and what have been proposed include alternating current heating method, Peltier heating method, heating plate heating method, fluid heating method and heating jacket heating method. However, these heating methods, for example, the Chinese patent (a lithium ion battery self-heating device and method, CN104282965A), require an additional power supply to power the heating wire, the heating time is about 10 minutes, and the heating rate is very low. In addition, the energy consumption of these heating methods is high, about 20% on average, which also limits the application of lithium ion batteries.

At the same time, how to dynamically detect the internal temperature of a lithium ion battery, which is an important parameter related to the safety control of the lithium ion battery, is also an important problem for usage. Present research is relatively mature, but the cost of the detection device is high, which is not beneficial to large-scale application.

Therefore, it is necessary to develop a high-performance lithium ion battery with both temperature detection and adjustment capabilities: under normal operating conditions, the temperature inside the cell of the lithium ion battery can be detected in real time; when it is required to operate at low temperatures (such as charging or discharging), the temperature of the battery rises rapidly in a controlled manner in a very short period of time (<5 min), so that normal electrical performance is shown. In this way, not only the internal operating temperature of the lithium ion battery can be dynamically monitored, but also the performance at low temperatures can be improved and the operating temperature range of the lithium ion battery can be widened; therefore, popularization and application of lithium ion batteries can be promoted.

SUMMARY

In order to solve the above technical problems, the present disclosure provides a lithium ion battery with an internal heating device, which can be charged rapidly and has high safety and improved performance at low temperatures.

The technical solution of the present disclosure is as follows:

A lithium ion battery with an internal heating device, a cell 1 is provided inside the battery, a first cell tab 11 and a second cell tab 12 are provided at the upper end of the cell 1, and the first cell tab 11 and the second cell tab 12 are respectively connected to the cell 1; a heat generating device 2 is provided inside the cell 1, the heat generating device 2 includes a first layer of heating sheet 2-1, and the first layer of heating sheet 2-1 is respectively connected to a first tab of the first layer of heating sheet 21 and a second tab of the first layer of heating sheet 22 extending outside of the cell; a control switch 5 is composed of a first control switch 51 and a second control switch 52; an external equipment and the second control switch 52 form a first branch, the first cell tab 11, the cell 1 and the second cell tab 12 form a second branch, and the first tab of the first layer of heating sheet 21, the first layer of heating sheet 2-1, the second tab of the first layer of heating sheet 22 and the first control switch 51 form a third branch; the second branch can be respectively connected in series with the first branch and the third branch, or the second branch is connected in parallel with the third branch and then connected in series with the first branch.

Furthermore, a first temperature acquisition device 3 is provided inside the cell, a second temperature acquisition device 4 is provided on the surface of the battery, and the control switch 5 can receive signals from the first temperature acquisition device 3 and the second temperature acquisition device 4.

Furthermore, when the second branch can be respectively connected in series with the first branch and the third branch, the external equipment is a load 6. Furthermore, when the second branch is connected in parallel with the third branch and then connected in series with the first branch, the external equipment is a charging device 7.

Furthermore, the first temperature acquisition device 3 and the second temperature acquisition device 4 can control the switching-on and switching-off of the first control switch 51 respectively, and the first temperature acquisition device 3 and the second temperature acquisition device 4 can control the switching-on and switching-off of the second control switch 52 respectively.

Furthermore, the cell is of a wound type or a stacked type.

Furthermore, the battery is a square or a cylindrical battery.

Furthermore, the battery is a liquid-state, semi-solid, or solid-state lithium ion battery.

Furthermore, the heat generating device 2 includes a second layer of heating sheet 2-2, and the second layer of heating sheet 2-2 is respectively connected to a first tab of the second layer of heating sheet 23 and a second tab of the second layer of heating sheet 24 extending outside of the cell; the first tab of the second layer of heating sheet 23, the second layer of heating sheet 2-2, the second tab of the second layer of heating sheet 24, and a third control switch form a fourth branch, and the fourth branch can be connected in series or in parallel with the third branch to form a common branch; the second branch can be connected in series with the first branch and the common branch, respectively, or the second branch is connected in parallel with the common branch and then connected in series with the first branch.

Furthermore, the first temperature acquisition device 3 and the second temperature acquisition device 4 can control the switching-on and switching-off of the third control switch 52 respectively.

Furthermore, the heat generating device is made of metal or inorganic non-metal material capable of generating Joule heat.

Further, the first temperature acquisition device 3 is a thermocouple or a thermistor, and the second temperature acquisition device 4 is a thermocouple or a thermistor.

The beneficial effect of the present disclosure is as follows:

(1) By means of heat compensation of the heat generating device, the temperature adaptability of the lithium ion battery can be improved, especially the adaptability to the environment of low temperatures, so that the charge and discharge performance of the lithium ion battery can be improved to a relatively high level in a wider temperature range. In the present disclosure, when the temperature of the lithium ion battery is increased from −30° C. to 30° C., the discharge capacity at 1 C rate is nearly doubled compared with the prior art lithium ion battery at −30° C.

(2) By means of the temperature acquisition device and heat generating device, the internal temperature of the cell can be dynamically detected during the operation of the lithium ion battery. When the temperature is higher than the safe temperature (for example, 55° C.), the operating state of the lithium ion battery can be adjusted in time to ensure safety; and when the temperature is lower than a predetermined temperature (for example, 30° C.), the heating program can be started in time to ensure good operating state, that is, within an appropriate temperature range, the capacity and charging rate of the lithium ion battery can be significantly improved.

DETAILED DESCRIPTION OF THE EMBODIMENTS

The present disclosure will be further described with reference to FIGS. 1-9.

Embodiment 1

Figure 1:
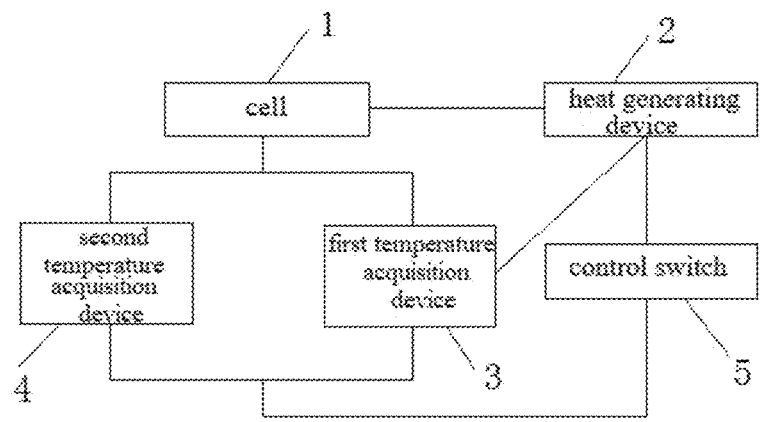
FIG. 1 is a schematic structural diagram of the lithium ion battery.
Figure 2:
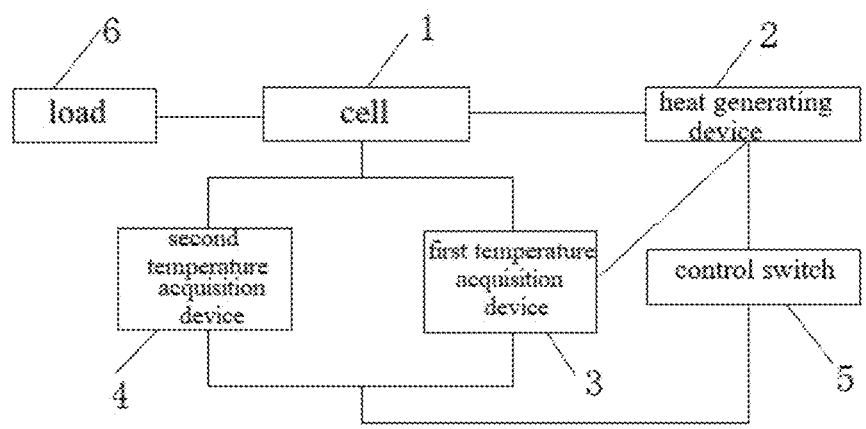
FIG. 2 is a schematic diagram of the connection of the lithium ion battery with a load.
Figure 3:
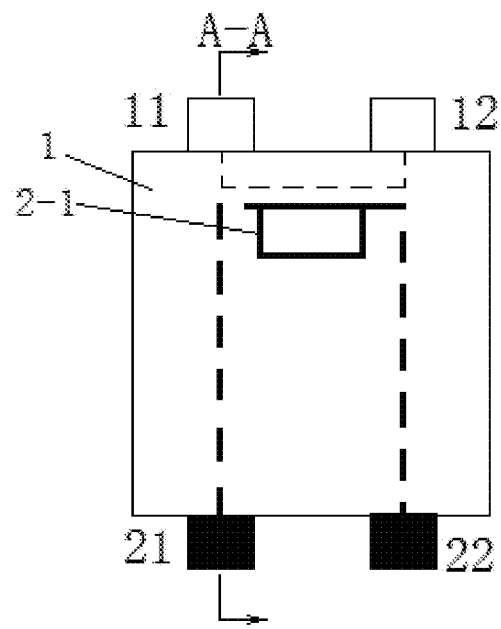
FIG. 3 is a schematic front view of the lithium ion battery with a single-layer assembled heat generating device.
Figure 4:
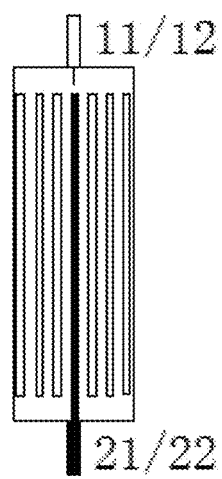
FIG. 4 is a schematic cross-sectional view taken along A-A in FIG. 3.

A lithium ion battery with an internal heating device is illustrated in FIGS. 1-4 and FIGS. 8-9, a cell 1 is provided inside the battery, a first cell tab 11 and a second cell tab 12 are provided at the upper end of the cell 1, and the first cell tab 11 and the second cell tab 12 are respectively connected to the cell 1; a heat generating device 2 is provided inside the cell 1, and the heat generating device 2 includes a first layer of heating sheet 2-1, the first layer of heating sheet 2-1 is respectively connected to a first tab of the first layer of heating sheet 21 and a second tab of the first layer of heating sheet 22 extending outside of the cell; a first temperature acquisition device 3 is provided inside the cell, a second temperature acquisition device 4 is provided on the surface of the battery, a control switch 5 can receive signals from the first temperature acquisition device 3 and the second temperature acquisition device 4, and the control switch 5 is composed of a first control switch 51 and a second control switch 52; an external equipment and the second control switch 52 form a first branch, the first cell tab 11, the cell 1 and the second cell tab 12 form a second branch, and the first tab of the first layer of heating sheet 21, the first layer of heating sheet 2-1, the second tab of the first layer of heating sheet 22 and the first control switch 51 form a third branch. The heat generating device is made of metal or inorganic non-metal material capable of generating Joule heat. The first temperature acquisition device 3 is a thermocouple or a thermistor, and the second temperature acquisition device 4 is a thermocouple or a thermistor. The cell is of a wound type or a stacked type. The battery is a square or a cylindrical battery. The battery is a liquid-state, semi-solid, or solid-state lithium ion battery. When the heat generating device is assembled as a single-layer structure as illustrated in FIGS. 3-4, the heat generating device 2 is placed at a position of ½ in the thickness direction of the lithium ion battery.

When the lithium ion battery is required to supply power to the load normally or to the heating device to obtain a temperature rise, the second branch can be connected in series with the first branch and the third branch respectively, and the external equipment is the load 6. The first temperature acquisition device 3 and the second temperature acquisition device 4 can control the switching-on and switching-off of the first control switch 51 respectively, and the first temperature acquisition device 3 and the second temperature acquisition device 4 can control the switching-on and switching-off of the second control switch 52 respectively. The working process is: the first temperature acquisition device and the second temperature acquisition device are used to detect the temperature value, wherein the temperature detection point of the cell is a predetermined temperature (that is, T1=30° C.), and the alarm point is a safe temperature (that is, T2=55° C.). Before the cell is ready to perform work on the load, the temperature value of the cell is detected by the first temperature acquisition device and the second temperature acquisition device. If the detected temperature is lower than the predetermined temperature, the first temperature acquisition device and the second temperature acquisition device generate signals at this time and send the signals to the first control switch to switch on the first control switch, and the first layer of heating sheet generates heat and the temperature of the cell is raised; when the temperature of the cell is higher than or equal to the predetermined temperature, the first temperature acquisition device and the second temperature acquisition device generate signals and send the signals to the first control switch to switch off the first control switch and switch on the second control switch, the heating is stopped and the power is supplied to the load; if the temperature of the cell is higher than the safe temperature during the power supply to the load, the first temperature acquisition device and the second temperature acquisition device generate signals and send the signals to the second control switch to switch off the second control switch, and the power supply to the load is stopped. Through the above adjustments, the service performance and safety performance of the lithium ion battery are improved.

Embodiment 2

The charging device supplies power to the lithium ion battery and the heat generating device, and at this time, the second branch is connected in parallel with the third branch and then is connected in series with the first branch; and the external equipment is the charging device 7. The first temperature acquisition device 3 and the second temperature acquisition device 4 can control the switching-on and switching-off of the first control switch 51 respectively, and the first temperature acquisition device 3 and the second temperature acquisition device 4 can control the switching-on and switching-off of the second control switch 52 respectively. Other features are the same as those in embodiment 1. The working process is: the first temperature acquisition device and the second temperature acquisition device are used to detect the temperature value, wherein the temperature detection point of the cell is a predetermined temperature (that is, T1=30° C.), and the alarm point is a safe temperature (that is, T2=55° C.). When the charging device is ready to charge the cell of the lithium ion battery, the first temperature acquisition device and the second temperature acquisition device acquire the temperature of the cell; and if the acquired temperature is lower than the predetermined temperature, the first temperature acquisition device and the second temperature acquisition device generate signals and send the signals to the first control switch and the second control switch, so that the first control switch and the second control switch are switched on, and the first layer of heating sheet heats the cell; when the temperature of the cell detected by the first temperature acquisition device and the second temperature acquisition device is higher than or equal to the predetermined temperature, the first temperature acquisition device and the second temperature acquisition device generate signals and send the signals to the first control switch 51 to switch off the first control switch, and the first layer of heating sheet stops heating; in the process of charging the cell by the charging device, when the temperature of the cell detected by the first temperature acquisition device and the second temperature acquisition device is higher than the safe temperature, the first temperature acquisition device and the second temperature acquisition device generate signals and send the signals to the second control switch to switch off the second control switch, and the charging device stops supplying power to the cell.

Embodiment 3

The heat generating device 2 includes a second layer of heating sheet 2-2, and the second layer of heating sheet 2-2 is respectively connected to a first tab of the second layer of heating sheet 23 and a second tab of the second layer of heating sheet 24 extending outside of the cell; the first tab of the second layer of heating sheet 23, the second layer of heating sheet 2-2, the second tab of the second layer of heating sheet 24, and a third control switch form a fourth branch, and the fourth branch can be connected in series or in parallel with the third branch to form a common branch; the second branch can be connected in series with the first branch and the common branch respectively, or the second branch is connected in parallel with the common branch and then connected in series with the first branch.

Figure 5:
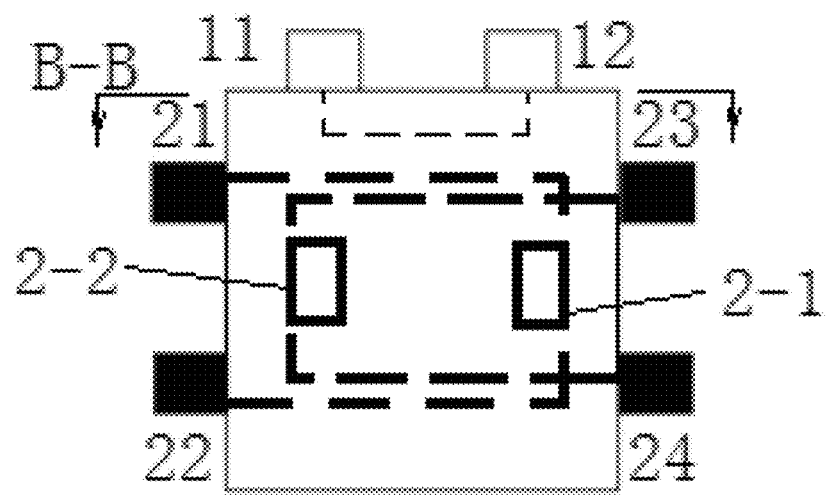
FIG. 5 is a schematic front view of the lithium ion battery with a double-layer assembled heat generating device.
Figure 6:
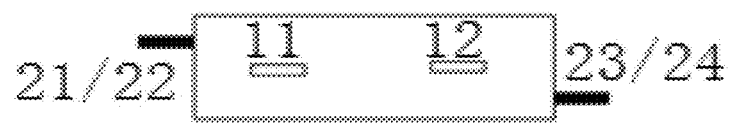
FIG. 6 is a schematic plan view of the lithium ion battery with a double-layer assembled heat generating device.
Figure 7:
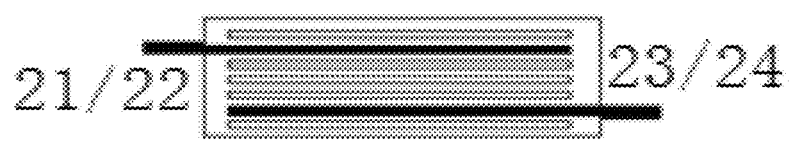
FIG. 7 is a schematic cross-sectional view taken along B-B in FIG. 5.
Figure 8:
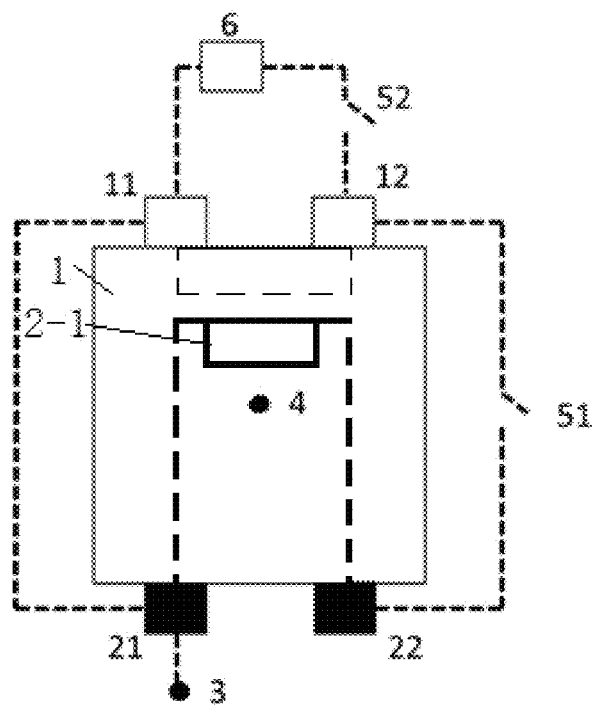
FIG. 8 is a schematic diagram of the connection the lithium ion battery with a single-layer assembled heat generating device with the load circuit.
Figure 9:
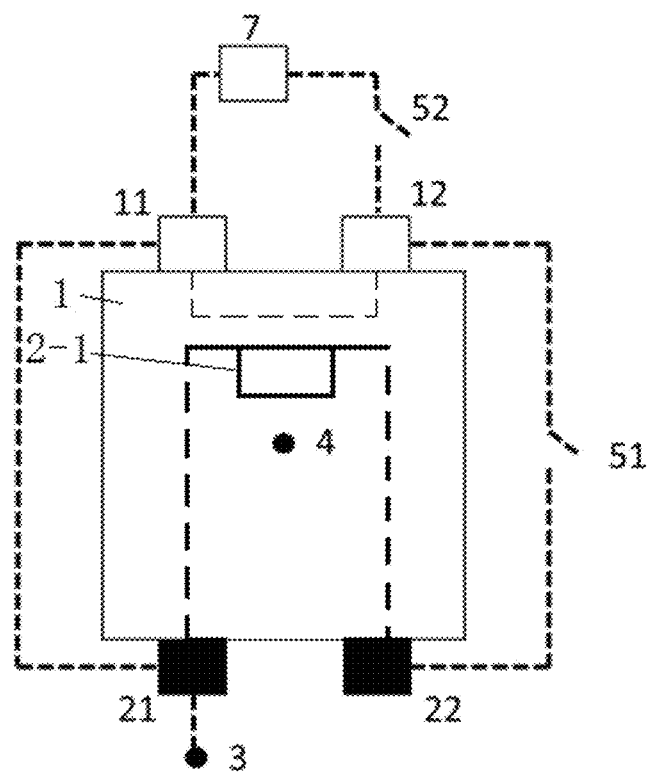
FIG. 9 is a schematic diagram of the connection of the lithium ion battery with a single-layer assembled heat generating device with the charging device; wherein, 1: cell, 11: first cell tab, 12: second cell tab, 2: heat generating device, 2-1: first layer of heating sheet, 2-2: second layer of heating sheet, 21: first tab of the first layer of heating sheet, 22: second tab of the first layer of heating sheet, 23: first tab of the second layer of heating sheet, 24: second tab of the second layer of heating sheet, 3: first temperature acquisition device, 4: second temperature acquisition device, 5: control switch, 51: first control switch, 52: second control switch, 6: load, 7: charging device.

When the heat generating device is assembled as a double-layer structure as illustrated in FIGS. 5-7, the heat generating device 2 is placed at a position of ¼ in the thickness direction of the lithium ion battery.

The above are only preferred embodiments of the present disclosure, and the protection scope of the present disclosure is not limited to the above. Although the present disclosure is described in detail with reference to the preceding embodiments, any modification of the technical solution of the embodiments or equivalent replacement of part of technical features thereof can be made by those skilled in the art. Any modification, equivalent replacement, and improvement made within the spirit and principle of the present disclosure shall be included in the protection scope of the present disclosure.

What is claimed is:

1. A lithium ion battery with an internal heating device, characterized in that, a cell is provided inside the battery, a first cell tab and a second cell tab are provided at the upper end of the cell, and the first cell tab and the second cell tab are respectively connected to the cell; a heat generating device is provided inside the cell, the heat generating device includes a first layer of heating sheet, the first layer of heating sheet is respectively connected to a first tab of the first layer of heating sheet and a second tab of the first layer of heating sheet extending outside of the cell; a control switch is composed of a first control switch and a second control switch; an external equipment and the second control switch form a first branch, the first cell tab, the cell and the second cell tab form a second branch, and the first tab of the first layer of heating sheet, the first layer of heating sheet, the second tab of the first layer of heating sheet and the first control switch form a third branch; the second branch can be respectively connected in series with the first branch and the third branch, or the second branch is connected in parallel with the third branch and then connected in series with the first branch;

a first temperature acquisition device is provided inside the cell, a second temperature acquisition device is provided on the surface of the battery, and the control switch can receive signals from the first temperature acquisition device and the second temperature acquisition device;

the first temperature acquisition device and the second temperature acquisition device can control the switching-on and switching-off of the first control switch respectively, and the first temperature acquisition device and the second temperature acquisition device can control the switching-on and switching-off of the second control switch respectively.

2. The lithium ion battery with an internal heating device according to claim 1, characterized in that, when the second branch can be respectively connected in series with the first branch and the third branch, the external equipment is a load.

3. The lithium ion battery with an internal heating device according to claim 1, characterized in that, when the second branch is connected in parallel with the third branch and then connected in series with the first branch, the external equipment is a charging device.

4. The lithium ion battery with an internal heating device according to claim 1, characterized in that, the cell is of a wound type or a stacked type.

5. The lithium ion battery with an internal heating device according to claim 1, characterized in that, the battery is a square or a cylindrical battery.

6. The lithium ion battery with an internal heating device according to claim 1, characterized in that, the battery is a liquid-state, semi-solid, or solid-state lithium ion battery.

7. The lithium ion battery with an internal heating device according to claim 1, characterized in that, the heat generating device includes a second layer of heating sheet, and the second layer of heating sheet is respectively connected to a first tab of the second layer of heating sheet and a second tab of the second layer of heating sheet extending outside of the cell; the first tab of the second layer of heating sheet, the second layer of heating sheet, the second tab of the second layer of heating sheet, and a third control switch form a fourth branch, and the fourth branch can be connected in series or in parallel with the third branch to form a common branch; the second branch can be connected in series with the first branch and the common branch, respectively, or the second branch is connected in parallel with the common branch and then connected in series with the first branch.

\* \* \* \* \*

UNITED STATES PATENT AND TRADEMARK OFFICE
CERTIFICATE OF CORRECTION

| | |
|---|---|
| PATENT NO. | : 11,342,606 B2 |
| APPLICATION NO. | : 16/760099 |
| DATED | : May 24, 2022 |
| INVENTOR(S) | : Ningning Wu et al. |

It is certified that error appears in the above-identified patent and that said Letters Patent is hereby corrected as shown below:

On the Title Page

Please delete at item (30) the priority data:
"(30) Foreign Application Priority Data
Jan. 17, 2019 (CN) ........................... 201910043020.1
Jan. 17, 2019 (CN) ........................... 201920075786.X"

Please add:
--(30) Foreign Application Priority Data
Jan. 17, 2019 (CN) ........................... 201910043020.X
Jan. 17, 2019 (CN) ........................... 201920075786.1--

Signed and Sealed this
Eleventh Day of October, 2022

Katherine Kelly Vidal
*Director of the United States Patent and Trademark Office*